United States Patent [19]

Singer

[11] Patent Number: 5,018,960

[45] Date of Patent: May 28, 1991

[54] FLAKING ROLL APPARATUS

[75] Inventor: Roy E. Singer, Crystal, Minn.

[73] Assignee: Wenger Manufacturing, Inc., Sabetha, Kans.

[21] Appl. No.: 464,166

[22] Filed: Jan. 12, 1990

[51] Int. Cl.⁵ .............................................. B29C 43/46

[52] U.S. Cl. .................................... 425/367; 264/175; 425/369; 425/DIG. 235; 426/621; 426/625

[58] Field of Search ............... 425/366, 367, 369, 373, 425/374, 149, 409, DIG. 235; 264/175; 426/621, 625

[56] References Cited

U.S. PATENT DOCUMENTS

| | | | |
|---|---|---|---|
| 427,159 | 5/1890 | Currie | 426/625 |
| 460,320 | 9/1891 | Currie | 426/621 |
| 651,776 | 6/1900 | Bourdeau | 426/621 |
| 1,831,531 | 11/1931 | Harder | 425/363 |
| 1,911,887 | 5/1933 | Fike | 99/355 |
| 2,039,229 | 4/1936 | Kratz | 264/212 |
| 2,408,961 | 11/1968 | Brunson | 425/223 |
| 2,693,154 | 11/1954 | Appleton | 425/367 |
| 2,694,831 | 11/1954 | Benedict et al. | 264/39 |
| 2,702,010 | 2/1955 | Schneider et al. | 425/230 |
| 2,728,103 | 12/1955 | Benedict et al. | 425/230 |
| 2,737,130 | 3/1956 | Rhodes | 425/367 |
| 2,788,752 | 4/1957 | Rhodes | 425/363 |
| 2,791,974 | 5/1957 | Copenhaver et al. | 425/391 |
| 3,240,148 | 3/1966 | Varga | 425/367 |
| 3,274,308 | 9/1966 | Freeman et al. | 425/363 |
| 3,561,050 | 2/1971 | Danforth | 425/367 |
| 3,589,308 | 6/1971 | Verhoeven | 425/101 |
| 3,741,702 | 6/1973 | Mazzoni | 425/363 |
| 3,814,260 | 11/1957 | Morgan | 425/367 |
| 3,824,054 | 7/1974 | Harris | 425/149 |
| 3,907,478 | 9/1975 | Vernon et al. | 425/367 |
| 3,972,672 | 8/1976 | Castro | 425/367 |
| 4,260,578 | 4/1981 | Moody | 264/40.7 |
| 4,302,478 | 11/1981 | Hamann et al. | 426/517 |
| 4,372,736 | 2/1983 | Gooch et al. | 425/367 |
| 4,531,996 | 7/1985 | Sukenik | 425/367 |
| 4,559,990 | 12/1985 | Greilinger et al. | 164/428 |
| 4,614,632 | 9/1986 | Kezuka et al. | 264/280 |
| 4,787,835 | 11/1988 | Cavanaugh | 425/367 |
| 4,810,179 | 3/1989 | Cavanaugh | 425/367 |

*Primary Examiner*—Jay H. Woo
*Assistant Examiner*—Khanh P. Nguyen
*Attorney, Agent, or Firm*—Hovey, Williams, Timmons & Collins

[57] ABSTRACT

Flaking roll apparatus (10) for the processing of cereal products or the like is provided which includes a pair of counterrotating, nip-defining flaking rolls (76, 78) which are obliquely oriented with the rotational axes thereof lying in a plane situated at an angle between about 15° and 70° with respect to the horizontal. In this manner, the apparatus (10) uses less floor space and can more readily be serviced and cleaned. The overall flaking apparatus (10) preferably includes threadably adjustable devices (136) for maintaining proper nip clearance between the flaking rolls (76, 78) and for precise adjustment thereof. Additionally, end-to-end adjustment of the flaking roll assembly (10) is afforded by means of an eccentric mount (108) for one of the flaking rolls (76).

7 Claims, 4 Drawing Sheets

FLAKING ROLL APPARATUS

BACKGROUND OF THE INVENTION

1. Field of the Invention

The present invention is broadly concerned with a flaking roll assembly useful in the production of cereal products or the like and which is characterized by provision of a pair of adjacent, rotatable, nip-defining flaking rolls oriented at an oblique angle so as to facilitate maintenance, clean-up and sanitation. More particularly, it is concerned with such a flaking roll assembly wherein the flaking rolls are oriented such that the rotational axes thereof lie in a plane which is at an angle of about 15° to 70° with respect to the horizontal; moreover, the flaking roll apparatus is improved by means of a novel nip clearance-adjusting mechanism and an eccentric mount for the lower roller permitting selective side-to-side pivoting adjustment thereof.

2. Description of the Prior Art

In the production of many cereal products, the starting materials are cooked via extrusion or other conventional means, whereupon the cooked product is passed through a flaking roll assembly so as to provide the well known cereal flakes. Generally speaking, such flaking roll assemblies include a pair of elongated, rotatable flaking rolls, normally oriented horizontally and provided with a product delivery chute and a flake collection device beneath the adjacent rollers. Exemplary devices of this character are illustrated in U.S. Pat. Nos. 651,776 and 2,702,010.

In practice, conventional flaking roll assemblies present a number of operational difficulties. First, these devices tend to be difficult to maintain and clean, particularly in and around the flaking rollers. As can be appreciated, the necessary frame supports, drives and other attendant equipment creates close quarters adjacent the flaking rollers, making sanitation a problem.

In addition, as conventional flaking roll assemblies wear, it is necessary to precisely adjust the respective rollers so as to maintain the appropriate nip clearance between the rollers. Obviously, flake formation is critically dependent upon maintenance of proper clearance between the flaking rollers. However, prior flaking roll assemblies, while including various expedients for roller adjustment, are deficient in that reliable, easy to use adjustment mechanisms are not available. This is particularly the case with respect to side-to-side pivoting adjustment of one roller relative to another.

SUMMARY OF THE INVENTION

The present invention overcomes the problems outlined above and provides an improved flaking roll assembly characterized by ease of maintenance and sanitation as well as provision of apparatus for precise nip clearance adjustment.

Broadly speaking, the flaking roll assembly of the invention includes a pair of elongated, axially rotatable, juxtaposed cooperating flaking rollers presenting a processing nip region therebetween, together with means mounting the roller pair with the rotational axes thereof lying in a plane oriented at an angle between about 15° and 70° (more preferably from about 30° to 60° ) with respect to the horizontal. The overall assembly further includes means for directing incoming feed material into the nip region for flaking thereof, together with structure associated with the flaking rolls (e.g., scraper blades) for separating processed, flaked material from the rollers after passage of the incoming feed material through the nip region. Finally, means is provided adjacent the underside of the flake rollers for directing flaked material falling from the rollers under the influence of gravity to a collection point below the nip region.

In preferred forms, the flaking roll assembly also includes structure operatively coupled to the roller pair for selective adjustment of nip clearance. To this end, such adjusting apparatus includes means mounting at least one of the rollers (and preferably the lower roller) for pivotal movement thereof about an axes generally parallel with the rotational axis of the roller, along with a pair of opposed plate members respectively coupled to corresponding rollers, with one of the plate members presenting a threaded opening therein. An elongated, threaded shank member is operatively threaded within the plate opening and is axially adjustable therein for engagement with the opposed plate member. Means such as hydraulic cylinder assemblies are also provided for selectively drawing the rollers together whereby effect engagement between the threaded shank member and the opposed roller-mounted plate. The engagement end of the shank member and the opposed plate are advantageously configured to cooperatively present concavo-convex engagement surfaces, so as to assure firm, mating engagement and thus precise nip clearance adjustment. Furthermore, the plate member opposed to the shank preferably includes one or more spacer shims therein to provide additional flexibility in maintaining proper nip clearances.

In order to provide side-to-side pivoting adjustment of one of the rollers relative to the other, the preferred processing unit of the invention includes a pair of laterally spaced apart frame members along with a pair of roller supports operably coupled with one flaking roller adjacent opposed ends thereof and each presenting a portion adjacent a corresponding frame member. A rotatable eccentric operatively interconnects each frame member with the adjacent support portion for selective eccentric movement of the corresponding roller support upon rotation of the associated eccentric. In this fashion, the adjustable roller may be pivoted side-to-side within the eccentric limits so as to insure an even nip clearance along the length of the adjacent rollers. Means is also provided for selectively locking each of the eccentrics at any one of a number of selected rotational positions thereof, so as to assure that nip adjustments are positively maintained during use of the flaking roll assembly.

DESCRIPTION OF THE PREFERRED EMBODIMENT

Figure 1:
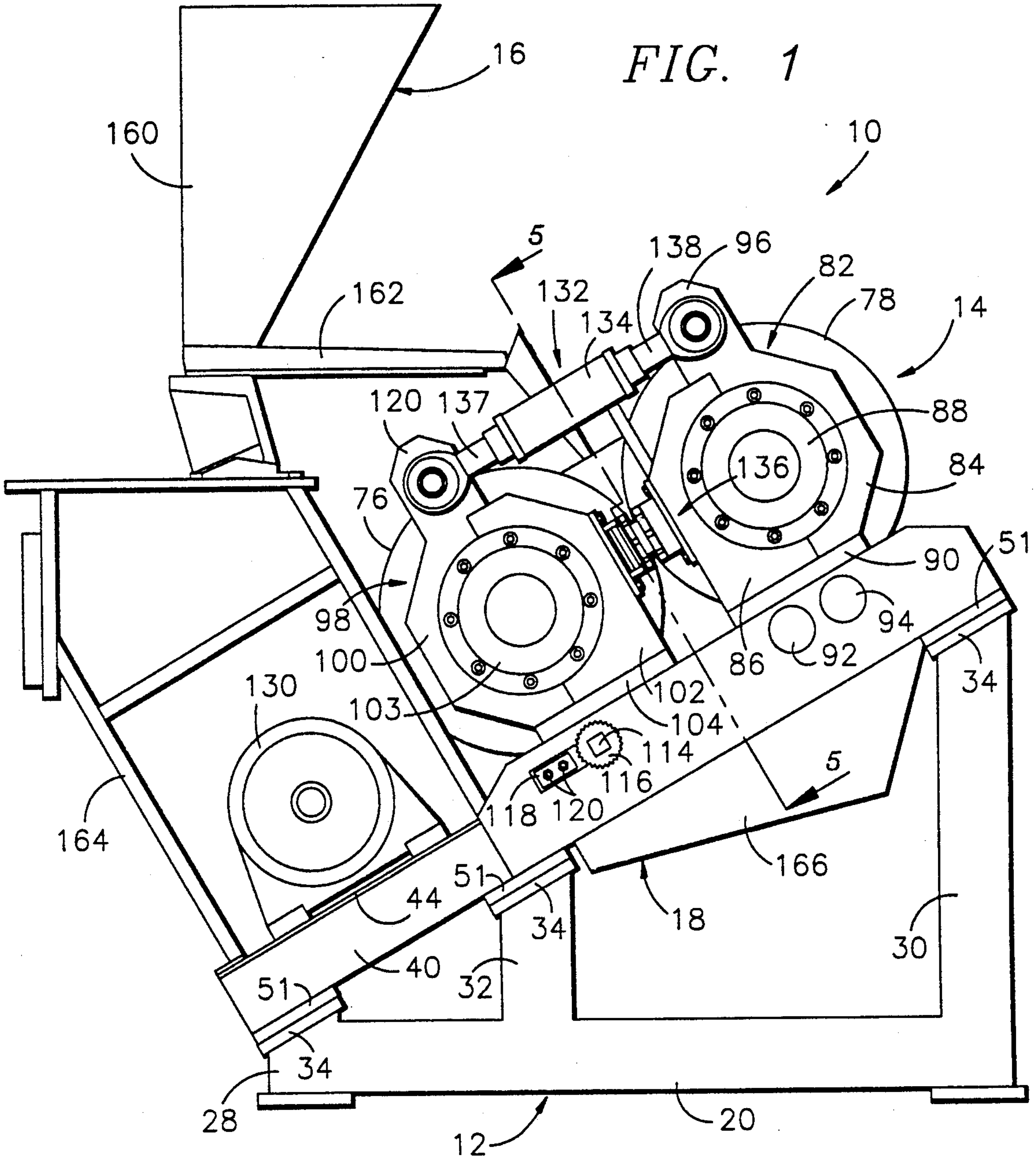
FIG. 1 is a side elevational view of the preferred flaking roll assembly in accordance with the invention.

Turning now to the drawings, and particularly FIG. 1, a flaking roll assembly 10 is illustrated. The assembly 10 broadly includes frame structure 12, powered roller assembly 14, delivery means 16, and output chute 18.

Figure 2:
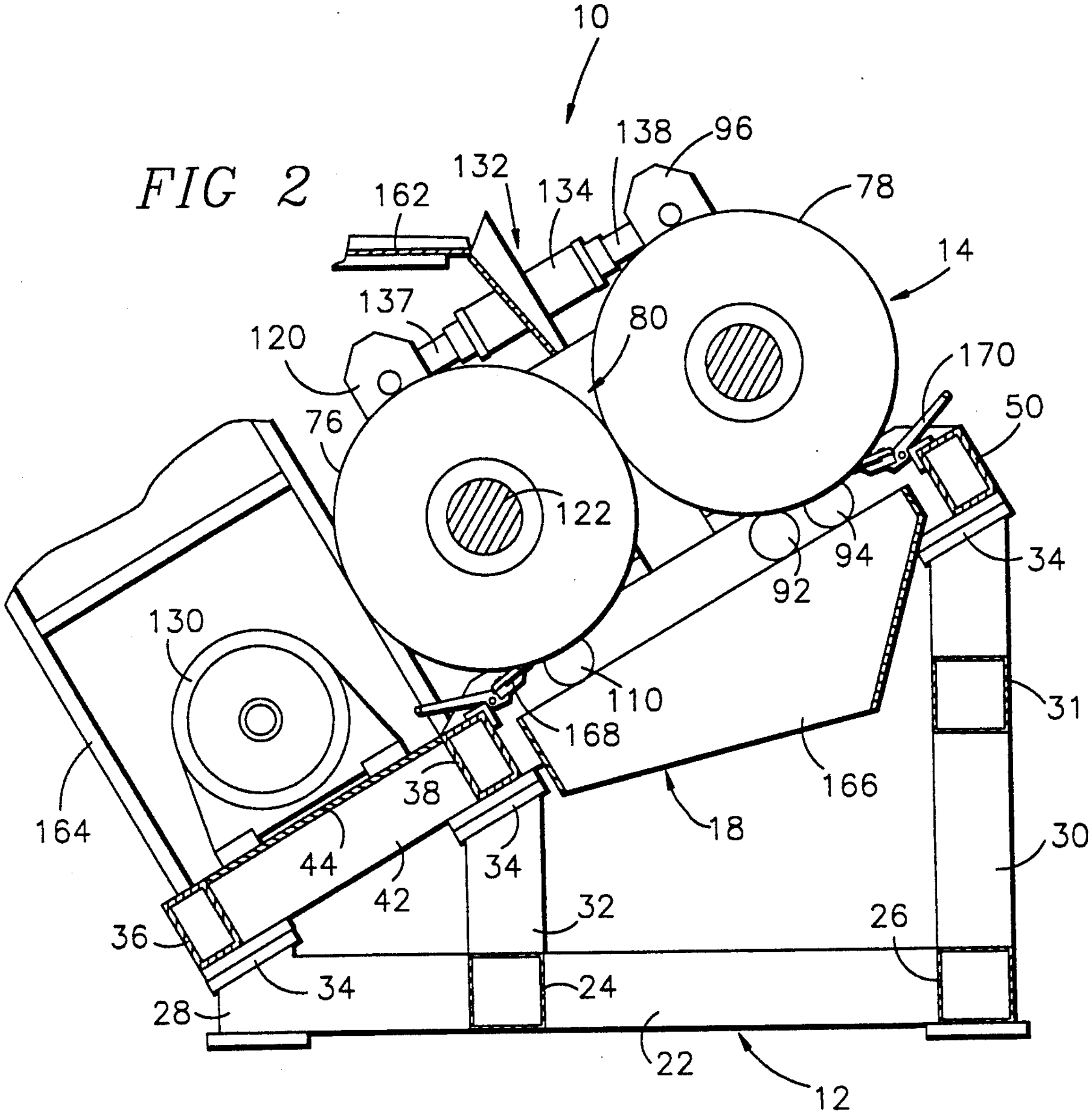
FIG. 2 is a fragmentary, sectional view similar to that of FIG. 1 but illustrating further details of the preferred assembly.

In more detail, the frame structure 12 includes a pair of elongated, laterally spaced apart lower beams 20, 22 together with cross beams 24–26 interconnecting the same. A total of four upright corner standards are also provided and are interconnected to the lower beams 20, 22. As illustrated, a pair of short standards 28 are employed adjacent the lefthand end of assembly 10 as viewed in FIG. 1, along with a pair of taller standards 30 adjacent the opposite end thereof provided with a cross beam 31 (see FIG. 2). A pair of intermediate upright standards 32 are also connected to the beams 20, 22 as shown. Each of the standards includes, adjacent its uppermost end, an obliquely oriented uppermost pad 34.

Figure 5:
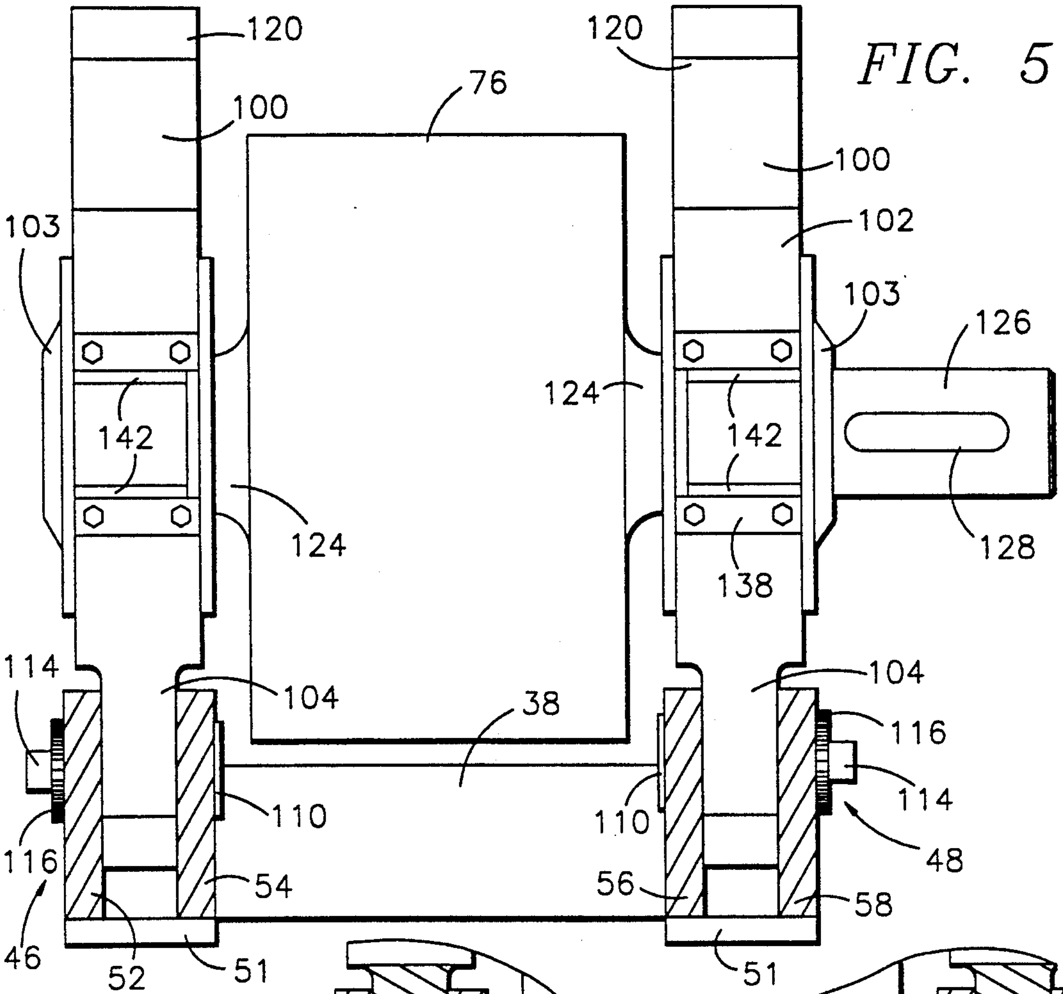
FIG. 5 is a sectional view taken along line 5—5 of FIG. 1 and illustrating the mounting arrangement for the lower processing roller of the assembly.
Figure 6:
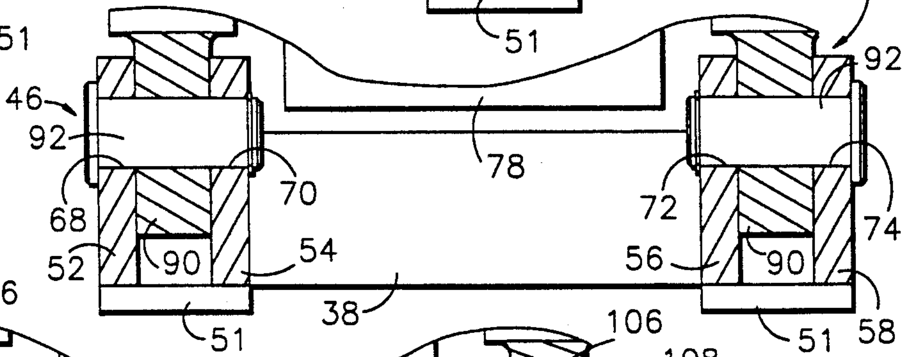
FIG. 6 is a fragmentary vertical sectional view depicting the mounting arrangement for the upper processing roller of the assembly.
Figure 7:
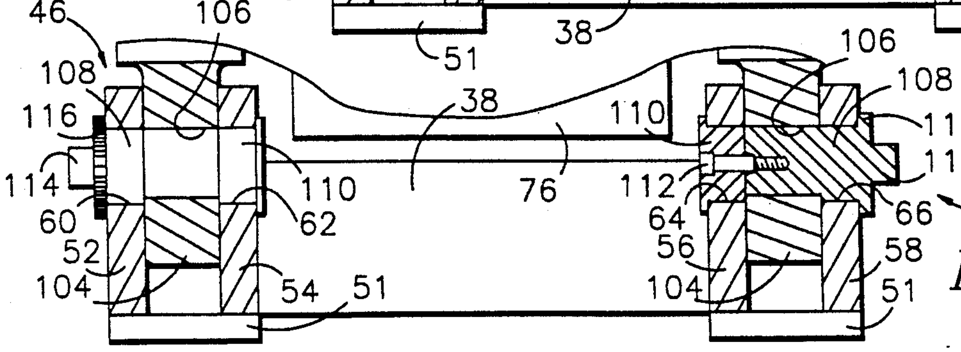
FIG. 7 is a fragmentary vertical sectional view of the lower processing roller mounting assembly, illustrating in detail the rotatable eccentrics forming a part thereof.

Frame structure 12 also includes a pair of spaced, transversely extending box beams 36, 38 interconnected by means of side plates 40, 42 and a spanning top plate 44. A pair of upwardly extending, roller-supporting frame elements 46, 48 are secured to the opposed ends of transverse box beam 38 and are interconnected, adjacent the uppermost ends thereof, by means of box beam 50. As best seen in FIGS. 5–7, each of the frame elements 46, 48 is in the form of a pair of elongated, laterally spaced apart plates 52, 54 (element 46) and 56, 58 (element 48). A total of six pads 51 are secured to the undersides of the beams 36, 38 and 50 as illustrated, in locations to mate with the pads 34 previously described. The pads 34, 51 are interconnected, typically by welding, so as to provide a rigid overall frame structure.

Turning to FIGS. 5–7, it will be seen that each plate pair 52, 54 and 56, 58 is provided with aligned lower apertures 60, 62, 64 and 66 (see FIG. 7) along with two adjacent pairs of upper apertures 68, 70, 72, 74 (FIG. 6). The significance of this structure will be made clear hereinafter.

Roller assembly 14 includes a pair of adjacent, juxtaposed processing rollers 76, 78 which cooperatively define a processing nip region 80 therebetween. In the illustrated embodiment, the rollers 76, 78 are smooth; those skilled in the art will appreciate, however, that such surfaces may be corrugated or configured in essentially any desired manner.

Upper roller 78 is secured to frame structure 12 by means of a pair of identical endmost bearing supports 82, each consisting of a pair of interconnected plate members 84, 86. The latter cooperatively support a roller bearing 88 of conventional construction. In addition, the plates 84, 86 cooperatively define a depending, apertured mounting section 90 designed to fit between the plates 52, 54 and 56, 58 as best seen in FIG. 6. Two pins 92, 94 extend through the aperture pairs 68, 70 and 72, 74 of the elements 52, 54 and 56, 58, and through the aligned mounting section apertures, so as to rigidly secure each bearing support 82 to the underlying frame element 46 or 48. In this fashion, it will be perceived that upper roller 78 is held fast against translational movement. The upper end of each plate 84 includes an upstanding tang 96, the purpose of which will be explained.

Lower roller 76 is likewise secured to frame structure 12 by means of a pair of endmost bearing supports 98 each including a pair of interconnected plate members 100, 102 supporting a roller bearing 103. The lower ends of the plate members 100, 102 cooperatively define a depending, apertured mounting section 104 which is apertured as at 106 and sized to fit between the plate pairs 52, 54 and 56, 58 (see FIG. 7). In order to allow side-to-side pivoting adjustment of the lower roller 78 relative to upper roller 76, a rotatable eccentric 108 is mounted within the apertures 60, 66 provided in plates 52 and 58 and extends through the mounting section apertures 106. A connector block 110 is mounted within the apertures 62, 64 of the plates 54, 56 and is provided with a bolt 112 which is threaded into the associated eccentric 106 (see FIG. 7). The outer face of each eccentric 108 adjacent the plates 52 and 58 is equipped with a wrench flat section 114 and a radially enlarged, toothed peripheral wheel 116. A shiftable eccentric locking bar 118, releasably secured in place by means of bolts 120, is mounted on the exterior face of each of the plates 52, 58 adjacent each wheel 116; the bar 118 is moved into an interfering relationship with the associated wheel 116 so as to lock the eccentric, and thereby the roller 76, in a desired position. The upper end of plate member 100 is likewise provided with a mounting tang 120.

The rollers 76, 78 are each equipped with oppositely extending mounting shafts 122, 124 which are received within the corresponding roller bearings 88 and 103 described previously. As illustrated in FIG. 5, however, the shaft 124 includes an extension 126 which passes through righthand bearing 103 and has a keyway 128 therein. Appropriate timing belt sprockets (not shown) are keyed to each shaft extension 126. In order to drive the rollers 76, 78 (normally clockwise for roller 76 and counterclockwise for roller 78), an electric motor 130 is supported on frame plate 44 and is equipped with a properly sized timing belt sprocket. A conventional timing belt (not shown) interconnects the belt sprockets of motor 130 and those keyed to the shaft extensions 126 of each roller 76, 78, to provide the necessary roller drive connection.

In order to effect precise adjustment of the nip clearance between the rollers 76, 78, an adjusting mechanism broadly referred to by the numeral 132 is provided between the rollers 76 and 78. This mechanism 132 includes hydraulic cylinders 134 each having outwardly extending piston rods 137 and 138 conventionally connected by means of clevis mounts or the like to the tangs 96, 120 on opposite ends of the roller pair. In addition, the overall adjusting mechanism 132 includes a pair of adjusting devices 136 coupled between the plates 86, 102 on opposite ends of the roller pair.

Figure 3:
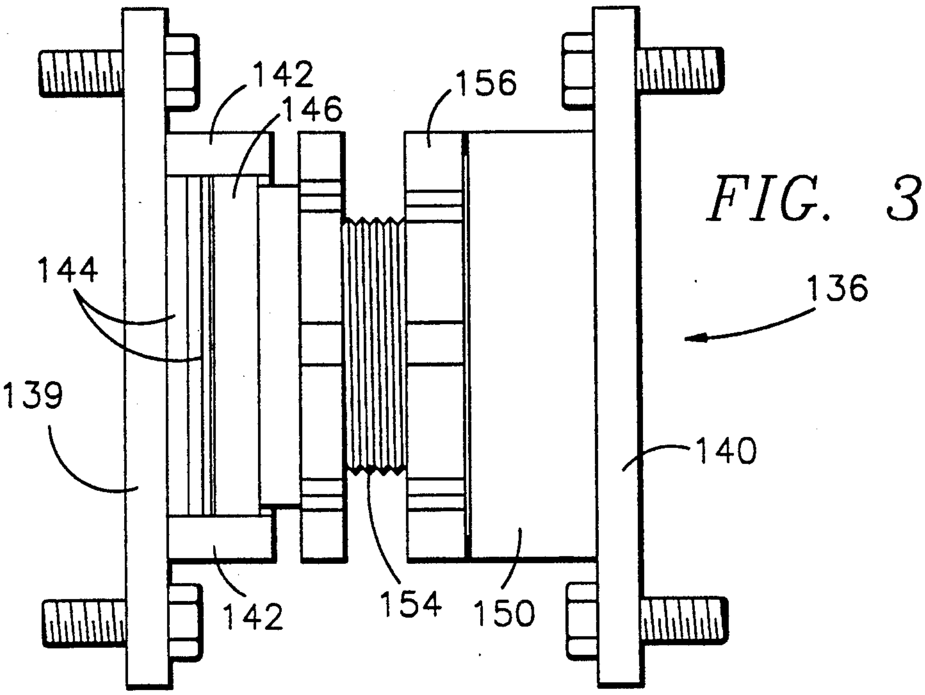
FIG. 3 is an enlarged side elevational view of the preferred apparatus for adjusting nip clearance.
Figure 4:
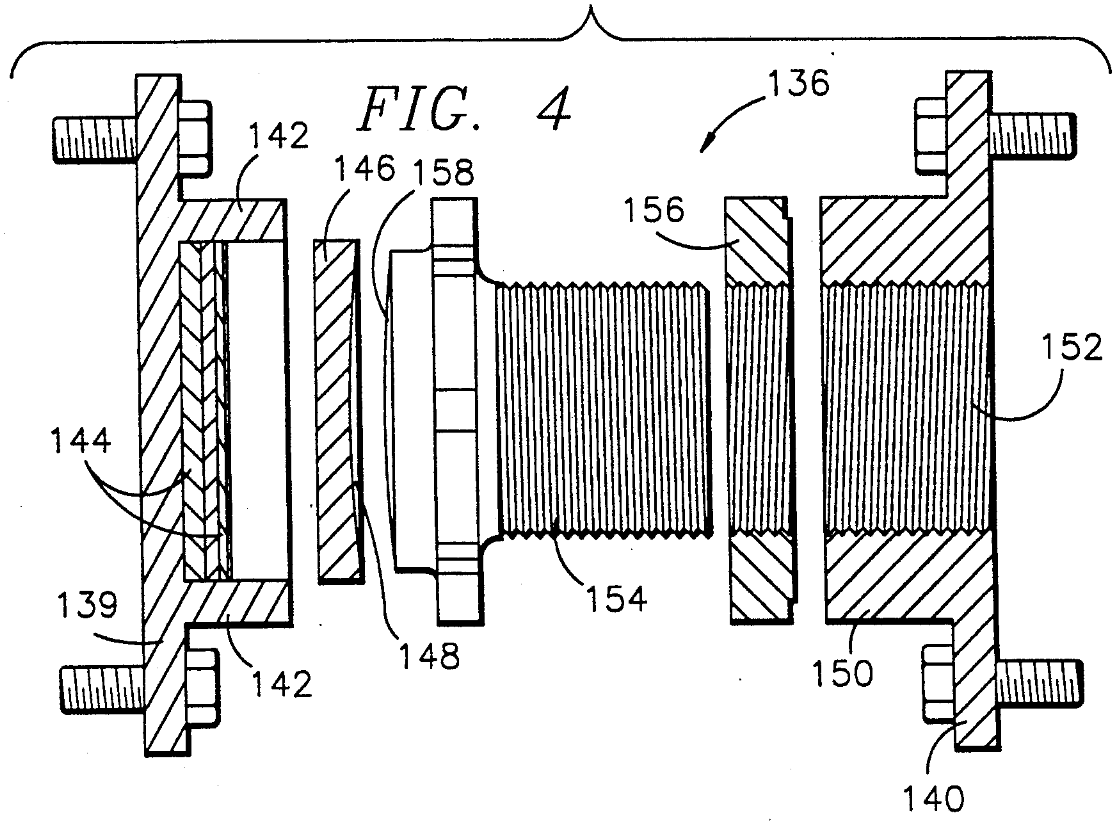
FIG. 4 is an exploded view of the apparatus illustrated in FIG. 3.

The device 136 is best illustrated in FIGS. 3 and 4 and includes a pair of opposed plates 139, 140 respectively designed for securement to the end surfaces of the plates 102, 86. Plate 139 includes a pair of spaced outwardly extending walls 142 designed to receive one or more shims 144 as well as an engagement plate 146 presenting a concave engagement surface 148.

Plate 140 on the other hand includes a tubular boss section 150 which is internally threaded as at 152. An elongated, complementally threaded shank member 154 is received within threaded opening 152 and is axially shiftable therealong. A jam nut 156 is also threaded onto shank 154 for securing the latter in any one of a number of axial positions within boss section 150. The outermost end of the shank member 154 is in the form of a convex engagement surface 158 configured for mating engagement with concave surface 148 of plate 146. As best seen from a comparison of FIGS. 1 and 3, the device 136 is rigidly secured between the plates 86, 102 at both ends of the roller pair, so that axial extension or retraction of shank members 154, in cooperation with the cylinders 134, will effect corresponding pivotal movement of lower roller 76 relative to roller 78.

Delivery means 16 is preferably in the form of an upright product hopper 160 together with a lower, two-piece vibratory delivery chute 162. The latter is oriented for delivery of product to be processed directly into nip region 80. The described delivery means 16 is situated above the roller pair 76, 78 and is supported by means of a conventional frame unit 164 secured to the main frame structure 12.

The delivery means for directing flaked product from assembly 10 is advantageously in the form of a chute 166 secured between the frame element plates 54, 56. In normal practice, a conveyor (not shown) or other appropriate collection apparatus will be positioned beneath chute 166 for removal of flaked product from the assembly 10 for further processing.

In order to insure that flaked product will not adhere to the peripheries of the rollers 76, 78, an elongated blade-type scraper 168, 170 is mounted below the associated rollers 76, 78 and in engagement therewith. The scrapers 168, 170 are respectively mounted on the box beams 38, 50 in an orientation for removal of adhered product from the roller peripheries and delivery thereof to chute 166.

In the use of assembly 10, a cereal or other product to be processed is fed from hopper 160 through vibratory chute 162 into nip region 80. As the product passes through the region 80, it is acted upon by the counterrotating rollers 76, 78 in order to flake the product. After passing through the nip region, the product descends under the influence of gravity through delivery chute 166 for collection and downstream processing, which may be tempering or drying. When the assembly 10 is shut down after a shift or the like, the roller 76, 78 may be separated by actuation of the cylinders 134 in a manner to extend the piston rods 137, 138. The rollers and associated structure can then be readily cleaned and the refuse from the assembly collected in the region beneath the roller assembly. The cylinders 134 can then be actuated to retract the piston rods 137, 138, which brings the rollers back to their initial position which has been set by virtue of the positioning of shank members 154 forming a part of the devices 136.

After a period of time, it may become necessary to adjust the rollers 76, 78 so as to assure that the nip clearance between the rollers is maintained. In one such adjustment, the rollers 76, 78 can be separated as described above (where the roller 76 is pivoted about the axis defined by the eccentrics 108); at this point, the jam nuts 156 are loosened, the shank members 154 are adjusted inwardly and outwardly as necessary, and the jam nuts retightened. In the event that this mode of adjustment is insufficient, shims 144 can be added or deleted from the plate members 139, or an engagement plate 146 of different thickness can be employed.

It will be appreciated that the above described adjustment has the effect of pivoting lower roller 76 to a greater or lesser extent about the axis of the eccentrics 108. Inasmuch as the engagement faces 148, 158 are of concavo-convex configuration, the faces will accommodate such pivoting of roller 76 without losing effective engagement.

It may also occur that end-to-end adjustment of the roller pair is required to maintain proper nip clearance, i.e., it may be necessary to pivot one of the rollers about a pivot axis which is normal to the rotational axis of the roller and also normal to an inclined plane passing through the rotational axes of the roller pair. Such an adjustment is possible by means of the previously described eccentrics 108. In particular, either or both of the eccentrics may be operated by first loosening the bolts 120 and retracting the associated bar 118 out of interference with the tooth wheel 116. At this point, the eccentric body may be rotated by engaging the associated wrench flat section 114 to achieve the desired adjustment. Thereupon, the locking bar 118 may be pushed back into engagement with the wheel 116 to prevent further rotation thereof, followed by tightening of the bolts 120. In this fashion, precise side-to-side adjustment of the type described may be readily accomplished.

I claim:

1. In a processing unit including a pair of elongated, axially rotatable, juxtaposed processing rollers presenting a processing nip therebetween, the improvement of apparatus for selective adjustment of the nip clearance between said rollers, said apparatus comprising:

means mounting at least one of said rollers for pivotal movement thereof about an axis generally parallel with the rotational axis thereof, said roller mounting means including a pair of laterally spaced apart bearing supports operatively coupled to said one roller adjacent opposed ends thereof, and eccentric means operatively engaging each of said bearing supports for selective, side-to-side pivoting adjustment of said one roller relative to the adjacent roller;

a pair of opposed plate members respectively coupled to a corresponding roller, one of said plate members presenting a threaded opening therein;

an elongated, threaded shank member operatively threaded within said opening and axially adjustable therein for engagement with the opposed plate member; and means for selectively drawing said rollers together whereby to effect engagement between said shank member and opposed plate member.

2. The processing unit of claim 1, said shank member and said opposed plate member presenting cooperating concavo-convex engagement surfaces.

3. The processing unit of claim 1, said opposed plate member including one or more spacer shims therein.

4. The processing unit of claim 1, said roller drawing means comprising a dual piston hydraulic cylinder assembly operatively coupled between said rollers.

5. The processing unit of claim 1, including means for selectively locking each of said eccentric means at any one of a number of selected rotational positions thereof.

6. In a processing unit including a pair of elongated, axially rotatable, juxtaposed processing rollers presenting a processing nip there between, the improvement of apparatus for selective, side-to-side pivoting adjustment of one of said rollers relative to the adjacent roller, said apparatus comprising:

a pair of laterally spaced apart frame members;

a pair of roller supports operatively coupled with said one roller adjacent the opposed ends thereof and each presenting a portion adjacent a corresponding frame member; and a rotatable eccentric operatively interconnecting each frame member with the adjacent support portion for selective eccentric movement of the corresponding roller support upon rotation of the associated eccentric.

7. The processing unit of claim 6, including means for selectively locking each of said eccentrics at any one of a number of selected rotational positions thereof.

* * * * *